United States Patent Office 2,785,046
Patented Mar. 12, 1957

2,785,046

SEPARATION OF URANIUM FROM OTHER METALS BY HYDRIDING

Thomas A. Butler, Ames, Iowa, assignor to the United States of America as represented by the United States Atomic Energy Commission No Drawing. Application September 29, 1944, Serial No. 556,499

14 Claims. (Cl. 23—14.5)

The invention relates to the separation of uranium from metallic compositions. It is frequently found that separation of uranium from metallic compositions containing this element in the metallic state is quite difficult particularly where the uranium is present in preponderant amount and where it is desired to remove metals dispersed in the uranium which are present in only small amounts, for example, of less than 25 percent by weight of the uranium.

The problem is particularly acute when applied to the recovery of plutonium which is the transuranic element having a mass of, for instance, 239 and an atomic number of 94, since this element is usually produced in a uranium mass in extremely small concentrations rarely over 0.1 percent by weight of the uranium and frequently as low as one part of plutonium per million parts by weight of uranium.

It has been established that when uranium is bombarded with neutrons, there is formed a variety of products of nuclear fission including a light group of elements having atomic numbers of from 35 to 46 inclusive and a heavy group of atomic numbers 51 to 60 inclusive and, in addition, a new element having an atomic number of 93 and an atomic weight of 239 which subsequently decays by beta decay to a second new element of atomic number 94 and mass of 239. This second new element is known as plutonium (symbol Pu).

An object of the present invention is to provide a simple method for separation of uranium from the transuranic element plutonium having an atomic number of 94, such as may be produced in the uranium by bombardment of the uranium with neutrons.

Another object of the present invention is to provide a convenient method for separating uranium from intermetallic mixtures containing uranium.

I have found that plutonium may be separated to a substantial degree from uranium by melting the uranium with a metal in which plutonium is preferentially soluble preferably using an amount of the other metal sufficient to cause separation of a phase comprising plutonium, generally in increased concentration, and the other metal. This phase may be separated from the uranium and used as such or subjected to further treatment for recovery of plutonium.

I have found that small quantities of many metals such as tin, copper, bismuth, silver or gold have a preferential action for removal of plutonium. For example, as little as 2 to 5 percent of tin when melted with neutron-irradiated uranium removes as much as 85 to 90 percent by weight of the plutonium, and upon cooling of the melt, the plutonium-rich tin phase separates in the form of solid dendrites dispersed in the uranium. These dendrites or other phase containing plutonium may be recovered in a simple manner as hereinafter described and a plutonium concentrate secured. This plutonium may be present as an alloy, or solid solution of the plutonium with the added metal and/or a dispersion of the plutonium in the added metal.

Generally it is found desirable to use an amount of metal just sufficient to remove plutonium in more concentrated form and it is preferred to avoid the use of a large excess of the added metal since the addition of unnecessary metal merely serves to dilute the composition and plutonium is removed in a less concentrated form. Consequently, the amount of plutonium-removing metal should be substantially less than the amount of uranium subjected to treatment and rarely should exceed 20 percent by weight of the uranium. The metals may be melted together by any convenient method. For example the uranium and other metal may be melted together or the tin or similar metal may be added to a molten pool of neutron-irradiated uranium.

The form in which the plutonium rich phase separates out depends to a substantial degree upon the nature and quantity of metal used. Where tin is used the tin phase generally separates upon cooling as dendrites dispersed in a uranium mass. On the other hand when copper or silver are used the mixture stratifies.

The problem of separating the uranium from dendrites and/or other solid phases is frequently difficult. While separation by gravity may be feasible in some cases it is not satisfactory in others. Moreover while selective extraction of one of the components without the other may be capable of use in some cases, it frequently is found to be unsatisfactory since often an accurate separation can not be secured.

In accordance with the present invention, it has been found that a satisfactory removal of uranium from uranium metal compositions containing other metallic components associated therewith may be effected by converting all or at least a portion of the uranium to hydride or nitride leaving the other metals substantially unhydrided or unnitrided; or, if nitrided or hydrided to some degree, the hydrides or nitrides of said other metals treated possess chemical characteristics such as to permit a ready separation from the hydrided uranium. This product is then treated to remove the uranium component from the other metal component by converting one of the components to a water-soluble or other readily removable compound. The hydrided or nitrided product is found to be surprisingly more amenable to treatment to effect an adequate separation of the uranium from the other component than is the metal composition before hydriding or nitriding. It has been found that the reactivity of hydrogen with uranium is so great that a selective conversion of the uranium to hydride may be secured without substantial effect upon numerous metals with which the uranium may be associated. The selective reaction may be effected by controlling the temperature at a suitably low level, for example 200 to 250° C. up to 300° C., and at a sufficiently low pressure of the hydrogen atmosphere, for example of 3 to 150 millimeters pressure to react rapidly with the uranium without substantial effect upon other metals which do not react or which react very slowly at the temperatures of operation. A suitable process of hydrogenating uranium as herein contemplated is described in copending application for United States Letters Patent Serial No. 546,178, filed by Amos S. Newton on July 22, 1944, and now Patent No. 2,426,745 entitled Method of Preparing Uranium Hydride.

Uranium hydride is much lighter and bulkier than uranium and where the uranium subjected to treatment is substantially free from internal oxide parting planes the hydride formed crumbles and falls from the uranium surface. Thus it has been discovered that, where massive uranium prepared by sintering or otherwise bonding uranium powder together contains internal oxide parting planes, it reacts to form only a coating of the hydride upon the surface which adheres and prevents further reaction. On the other hand when massive uranium free from such oxide planes is treated, the hydride crumbles and falls from the uranium continuously exposing new uranium and causing the reaction to proceed until it is completed.

Accordingly it is usually preferable to subject uranium which is substantially free from oxide parting planes to neutron bombardment in order to produce plutinium to be removed as herein contemplated. Uranium suitable for this process may be prepared by heating a mixture of $UF_4$ with metallic magnesium or calcium to reaction temperature permitting reaction to occur to form molten uranium and maintaining the uranium in molten state for a time sufficient to permit uranium to separate as a molten pool and the magnesium or calcium fluoride formed and other impurities to separate from the uranium and collect as a slag layer which may be removed from the metal. This reaction is conducted in a bomb or other reactor in which oxygen or air may be excluded. Uranium so produced in massive form has a melting point below 1200° C. and a density above 18 and is substantially free from internal oxide parting planes.

During hydrogenation the plutonium is substantially unaffected by the hydrogen and remains in its metallic state. As a result after treatment of the mass with hydrogen the plutonium may be separated from the hydride by taking advantage of the differences in the chemical properties of the components.

In accordance with the present invention it has been found that the hydrided uranium may be effectively removed from the unhydrided material by a selective conversion of the hydride or the unhydrided component to a more readily removable compound. For example the mixture of hydrided and unhydrided material may be treated with a reagent capable of converting one or the other component to a water-soluble state. Thus where tin is used the mixture of hydride and tin-plutonium component may be leached with a 2 to 3 normal HCl solution at an elevated temperature, for example of about 90° C., to remove the tin and plutonium leaving the hydride behind. Sulphuric acid and other nonoxidizing acids of concentrations up to 2 or 3 normal may be used in a similar manner to leach away the tin-plutonium phase. Where gold is used to remove the plutonium, the mixture of uranium hydride and gold may be treated with silver nitrate solution in order to dissolve uranium and leave the gold unaffected.

In a similar manner the hydrided uranium may be removed from other metals by selectively converting the uranium to a water-soluble chloride, bromide or sulphate or other water-soluble salt using reagents of relatively low acidity to prevent attack of the unhydrided component and usually employing an oxidizing agent such as silver nitrate and converting the uranium to the uranyl state to form a water-soluble uranyl compound such as uranyl nitrate. Other solutions such as of antimony chloride ($SbCl_3$), silver acetate, mercurous nitrate, etc., may be used to convert the uranium hydride to a water soluble state and permit removal thereof. Numerous other oxidizing agents, particularly weak oxidizing agents capable of oxidizing metallic or hydrided uranium to hexavalent or tetravalent uranium including silver perchlorate and silver tartrate, may be used in a similar manner.

In carrying out the process, the separation treatment preferably is conducted within a short time after the uranium hydride is formed and cooled, since on standing on contact with air, the uranium hydride may change to a form which may be more difficult to separate from the plutonium-rich metal phase. This effect can be overcome by keeping the hydride in a vacuum or under an inert gas such as nitrogen or carbon dioxide.

Since uranium hydride is a somewhat difficult material to handle due to its pyrophoric nature it is frequently advantageous to convert the uranium hydride to uranium nitride. The nitride is a comparatively stable substance that can readily be handled in the air and may be readily subjected to separation methods without serious danger of fire or explosion. This conversion can be carried out by treating the uranium hydride with ammonia, $NH_3$, at fairly low temperatures such as from 200° to 350° C. and preferably at about 250° C. The uranium hydride is converted by this process to uranium nitride having a composition corresponding approximately to the formula UN. In place of first forming the hydride, the uranium metal can be directly converted to the nitride by treatment with ammonia although a considerably longer time may be required to complete the reaction where the temperature of formation is kept low.

If desired, uranium metal or uranium hydride can be treated with ammonia at elevated temperatures such as from 700° to 1000° C. to form a nitride having a formula corresponding approximately to $U_4N_7$. This high temperature nitride is substantially similar to the low temperature nitride, UN, in many of its physical and chemical characteristics. Accordingly, the low temperature nitride is preferred because of the case of formation at lower temperatures.

When the uranium hydride or the uranium metal is converted to nitride, the plutonium-rich phase is not affected and remains in its metallic state. Accordingly, it can be separated from the nitride by physical means such as sieving or flotation or by chemical means such as acid leaching with dilute acids such as dilute hydrochloric acid which dissolve the nitride and leaves the alloy substantially unaffected.

The plutonium-tin or other metal concentrate obtained contains plutonium in a concentration substantially greater than that present in neutron-irradiated uranium. Usually the concentration is at least 3 to 5 times the plutonium concentration of neutron-irradiated uranium based upon the total metal content of the concentrate. The plutonium may be further concentrated by suitable means such as by precipitation or adsorption from solution or by other methods.

The following examples are illustrative.

*Example 1*

5.27 parts by weight of metallic tin was melted with 107 parts by weight of neutron-irradiated uranium containing about 200 milligrams of plutonium per ton of uranium. After mixing the molten mass until the components were well mixed the mixture was permitted to cool and solidify. The tin-plutonium-rich concentrate solidified in the form of dendrites scattered throughout the mass of uranium.

The mass was placed in a chamber and the chamber evacuated and flushed with hydrogen whereupon the temperature within the chamber was raised to 250° C. Hydrogen was introduced at a rate sufficient to maintain the hydrogen pressure at about 25 millimeters of mercury absolute pressure. The free uranium converted to powdered uranium hydride and the resulting mixture comprised a pulverized mixture of hydrided and substantially unhydrided components.

The mixture was leached with 2 normal hydrochloric acid solution in amount sufficient to dissolve the tin dendrites from the uranium hydride. The temperature of the leaching solution was maintained at 90° C. and leaching was continued for one hour under an atmosphere of $CO_2$. Approximately 92 percent of the plutonium, 13 percent of the uranium and 70 percent of the tin was dissolved.

This process may be performed with similar results using 1 to 2.5 normal solutions of sulphuric acid or other nonoxidizing acids preferably in concentrations not over about 5 normal. Likewise similar results may be secured by converting the free uranium to nitride and leaching with HCl or $H_2SO_4$ solutions as herein contemplated.

The uranium hydride remaining was washed with water to remove acid and then with methanol to remove water and was dried in vacuo and heated to 400° C. in an atmosphere of hydrogen whereupon metallic uranium was secured. This uranium was recovered and further processed for production of plutonium by neutron bombardment.

*Example 2*

The process of Example 1 was repeated forming the hydride as therein described. Gaseous ammonia was then introduced into the chamber and the hydride was heated at 250° C. until it was converted to nitride. This nitride was leached as in Example 1 for removal of the plutonium concentrate.

*Example 3*

The process of Example 1 was repeated using 3 parts by weight of gold in lieu of tin; the product was reacted with hydrogen to convert the free uranium to hydride. The powder thus secured was extracted with a solution of silver nitrate whereupon the uranium hydride was decomposed, uranium dissolved and silver precipitated. The residue was extracted with 7 normal nitric acid solution to dissolve the silver and approximately 81 percent of the plutonium was left in the residue which contained 86 percent of the gold and but one percent of the uranium.

Nitrided products may be treated similarly.

While the process has been described with particular reference to the recovery and/or concentration of plutonium it is not limited thereto since it may be applied to separation of uranium from other alloys or metallic phases either in the presence or absence of plutonium. For example misch metal or other rare earth metals may be separated from uranium by conversion of uranium to hydride or nitride and treated as herein contemplated.

Although the present invention has been described with particular reference to the specific details of certain embodiments thereof it is not intended that such details shall be regarded as limitations upon the scope of the invention except insofar as included in the accompanying claims. This application is generally related to the subject matter described and claimed in copending application of Frank H. Spedding and Thomas A. Butler, Serial No. 556,498, filed September 29, 1944.

I claim:

1. A process for separating uranium from an alloy containing uranium and at least one other metal wherein uranium has a higher reactivity with hydrogen than any other metal present in the alloy, comprising contacting said alloy with hydrogen gas at a temperature for uranium hydriding to form a uranium hydride powder phase and a metal phase, and separating said two phases.

2. The process of claim 1 wherein hydriding is carried out between 200° and 300° C. and at a hydrogen pressure of from 3 to 150 mm.

3. The process of claim 1 wherein said uranium hydride is converted to uranium nitride prior to separation of the two phases.

4. The process of claim 1 wherein said alloy contains tin.

5. The process of claim 1 wherein said alloy contains gold.

6. The process of claim 1 wherein said alloy contains silver.

7. The process of claim 1 wherein said alloy contains copper.

8. The process of claim 1 wherein said alloy contains rare earth metal.

9. A process for separating uranium from an alloy containing uranium and at least one other metal wherein uranium has a higher reactivity with hydrogen than any other metal present in the alloy, comprising contacting said alloy with hydrogen gas at a temperature for uranium hydriding to form a uranium hydride powder phase and a metal phase, and dissolving said metal phase in a non-oxidizing mineral acid.

10. The process of claim 9 wherein the mineral acid is hydrochloric acid.

11. The process of claim 10 wherein the alloy contains tin.

12. The process of claim 9 wherein the mineral acid is sulfuric acid.

13. The process of claim 1 wherein the metal is gold and the uranium hydride is dissolved for phase separation.

14. The process of claim 13 wherein the uranium hydride is dissolved in a silver nitrate solution.

References Cited in the file of this patent

UNITED STATES PATENTS

| | | |
|---|---|---|
| 1,019,581 | Zerning | Mar. 5, 1912 |
| 2,206,634 | Fermi et al. | July 2, 1940 |

OTHER REFERENCES

Hackh's Chemical Dictionary by Grant, 3rd ed., p. 667 (1944).